United States Patent
Maki et al.

(10) Patent No.: US 9,653,191 B2
(45) Date of Patent: May 16, 2017

(54) COPPER ALLOY FOR ELECTRIC AND ELECTRONIC DEVICE, COPPER ALLOY SHEET FOR ELECTRIC AND ELECTRONIC DEVICE, CONDUCTIVE COMPONENT FOR ELECTRIC AND ELECTRONIC DEVICE, AND TERMINAL

(71) Applicants: MITSUBISHI MATERIALS CORPORATION, Tokyo (JP); Mitsubishi Shindoh Co., Ltd., Tokyo (JP)

(72) Inventors: Kazunari Maki, Saitama (JP); Hiroyuki Mori, Tsukuba (JP); Daiki Yamashita, Osaka (JP)

(73) Assignees: MITSUBISHI MATERIALS CORPORATION, Tokyo (JP); MITSUBISHI SHINDOH CO., LTD., Tokyo (JP)

(*) Notice: Subject to any disclaimer, the term of this patent is extended or adjusted under 35 U.S.C. 154(b) by 0 days.

(21) Appl. No.: 14/652,389

(22) PCT Filed: Dec. 26, 2013

(86) PCT No.: PCT/JP2013/084903
§ 371 (c)(1),
(2) Date: Jun. 15, 2015

(87) PCT Pub. No.: WO2014/104198
PCT Pub. Date: Jul. 3, 2014

(65) Prior Publication Data
US 2015/0325326 A1    Nov. 12, 2015

(30) Foreign Application Priority Data

Dec. 28, 2012  (JP) .................................. 2012-288051
Dec. 5, 2013   (JP) .................................. 2013-252331

(51) Int. Cl.
B32B 15/20     (2006.01)
C22C 9/04      (2006.01)
(Continued)

(52) U.S. Cl.
CPC ............. *H01B 1/026* (2013.01); *B32B 15/01* (2013.01); *B32B 15/04* (2013.01); *B32B 15/043* (2013.01);
(Continued)

(58) Field of Classification Search
CPC .... C22C 9/04; C22C 9/00; C22C 9/06; C23C 2/08; C23C 30/00; C23C 30/005;
(Continued)

(56) References Cited

U.S. PATENT DOCUMENTS 5,893,953 A   4/1999  Bhargava
6,099,663 A   8/2000  Bhargava
(Continued)

FOREIGN PATENT DOCUMENTS

CN    101180412 A     5/2008
CN    101693960       4/2010
(Continued)

OTHER PUBLICATIONS

International Search Report mailed Mar. 4, 2014 for the corresponding PCT Application No. PCT/JP2013/084903.
(Continued)

*Primary Examiner* — Michael E La Villa
(74) *Attorney, Agent, or Firm* — Leason Ellis LLP

(57) ABSTRACT

The present invention relates to a copper alloy for electric and electronic device, a copper alloy sheet for electric and electronic device, a conductive component for electric and electronic device, and a terminal. The copper alloy for electric and electronic device includes more than 2.0 mass % to 15.0 mass % of Zn; 0.10 mass % to 0.90 mass % of Sn;
(Continued)

0.05 mass % to less than 1.00 mass % of Ni; 0.001 mass % to less than 0.100 mass % of Fe; 0.005 mass % to 0.100 mass % of P; and a remainder comprising Cu and unavoidable impurities, in which $0.002 \leq Fe/Ni < 1.500$, $3.0 < (Ni+Fe)/P < 100.0$, and $0.10 < Sn/(Ni+Fe) < 5.00$ were satisfied by atomic ratio, and a yield ratio YS/TS is more than 90% which is calculated from a strength TS and a 0.2% yield strength YS when a tensile test is performed in a direction parallel to a rolling direction.

25 Claims, 1 Drawing Sheet

(51) Int. Cl.
| | | |
|---|---|---|
| H01B 1/02 | (2006.01) | |
| H01B 5/02 | (2006.01) | |
| C23C 30/00 | (2006.01) | |
| C22C 9/06 | (2006.01) | |
| C22C 9/00 | (2006.01) | |
| C23C 2/08 | (2006.01) | |
| B32B 15/04 | (2006.01) | |
| B32B 15/01 | (2006.01) | |
| C22F 1/08 | (2006.01) | |

(52) U.S. Cl.
CPC ............... *C22C 9/00* (2013.01); *C22C 9/04* (2013.01); *C22C 9/06* (2013.01); *C23C 2/08* (2013.01); *C23C 30/00* (2013.01); *C23C 30/005* (2013.01); *H01B 5/02* (2013.01); *B32B 15/20* (2013.01); *C22F 1/08* (2013.01); *Y10T 428/12* (2015.01); *Y10T 428/1291* (2015.01); *Y10T 428/12431* (2015.01); *Y10T 428/12438* (2015.01); *Y10T 428/12715* (2015.01); *Y10T 428/12882* (2015.01); *Y10T 428/12903* (2015.01); *Y10T 428/12917* (2015.01); *Y10T 428/12924* (2015.01)

(58) Field of Classification Search
CPC ........... Y10T 428/12715; Y10T 428/12; Y10T 428/12882; Y10T 428/12903; Y10T 428/1291; Y10T 428/12917; Y10T 428/12924; Y10T 428/12431; Y10T 428/12438; B32B 15/01; B32B 15/04; B32B 15/043; B32B 15/20
See application file for complete search history.

(56) References Cited

U.S. PATENT DOCUMENTS

| 6,471,792 | B1 | 10/2002 | Breedis et al. | |
|---|---|---|---|---|
| 6,679,956 | B2 | 1/2004 | Bhargava | |
| 6,695,934 | B1 | 2/2004 | Bhargava | |
| 2002/0159912 | A1 | 10/2002 | Oishi | |
| 2009/0101243 | A1 | 4/2009 | Aruga et al. | |
| 2012/0175026 | A1* | 7/2012 | Agruga | B22D 11/004 148/554 |

FOREIGN PATENT DOCUMENTS

| JP | 63-161134 A | 7/1988 |
|---|---|---|
| JP | 05-033087 A | 2/1993 |
| JP | 05-311289 A | 11/1993 |
| JP | 06-184679 A | 7/1994 |
| JP | 11-036028 A | 2/1999 |
| JP | 2000-178670 A | 6/2000 |
| JP | 2001-303159 A | 10/2001 |
| JP | 2002-003966 A | 1/2002 |
| JP | 2002-530523 A | 9/2002 |
| JP | 2003-306732 A | 10/2003 |
| JP | 2005-029826 A | 2/2005 |
| JP | 2005-060773 A | 3/2005 |
| JP | 2005-163127 A | 6/2005 |
| JP | 3717321 B | 11/2005 |
| JP | 2006-283060 A | 10/2006 |
| JP | 2006-291356 A | 10/2006 |
| JP | 2007-084920 A | 4/2007 |
| JP | 2007-100111 A | 4/2007 |
| JP | 2007-182615 A | 7/2007 |
| JP | 3953357 B | 8/2007 |
| JP | 2011-184775 A | 9/2011 |
| JP | 2012-122095 A | 6/2012 |
| JP | 2012-158829 A | 8/2012 |
| JP | 2013-007062 A | 1/2013 |
| TW | 490496 B | 6/2002 |
| WO | WO-00/29632 | 5/2000 |
| WO | WO-2010/134210 A | 11/2010 |
| WO | WO-2012/026610 A | 3/2012 |
| WO | WO-2012/096237 A | 7/2012 |
| WO | WO-2013/103149 A | 7/2013 |

OTHER PUBLICATIONS

Office Action mailed Dec. 29, 2014 for the corresponding Taiwanese Application No. 102148752.
Lee et al., "Fretting Corrosion of Tin-Plated Copper Alloy", *IEEE Transactions on Components, Hybrids, and Manufacturing Technology*, 1987, pp. 63-67, vol. CHMT-10, No. 1.
International Search Report mailed Apr. 3, 2012 for the related PCT Application No. PCT/JP2012/050201.
International Search Report mailed Mar. 12, 2013 for the related PCT Application No. PCT/JP2013/050004.
International Search Report mailed Aug. 6, 2013 for the related PCT Application No. PCT/JP2013/067814.
International Search Report mailed Aug. 6, 2013 for the related PCT Application No. PCT/JP2013/067863.
International Search Report mailed Sep. 3, 2013 for the related PCT Application No. PCT/JP2013/068834.
Requirement for Restriction/Election mailed May 8, 2014 for the related U.S. Appl. No. 14/114,862.
US Office Action mailed Jun. 4, 2014 for the related U.S. Appl. No. 14/114,862.
Office Action mailed May 5, 2016 for the corresponding Chinese Patent Application No. 201380067853.0.
Andrade et al., "Classical univariate calibration and partial least squares for quantitative analysis of brass samples by laser-induced breakdown spectroscopy", *Spectrochimica Acta Part B: Atomic Spectroscopy*, Apr. 24, 2010, pp. 658-663, vol. 65, No. 8, New York, NY, US.
Extended European Search Report mailed Aug. 19, 2016 for the corresponding European Patent Application No. 13867578.0.
Office Action mailed Dec. 23, 2016 for the corresponding Chinese Patent Application No. 201380067853.0.

* cited by examiner

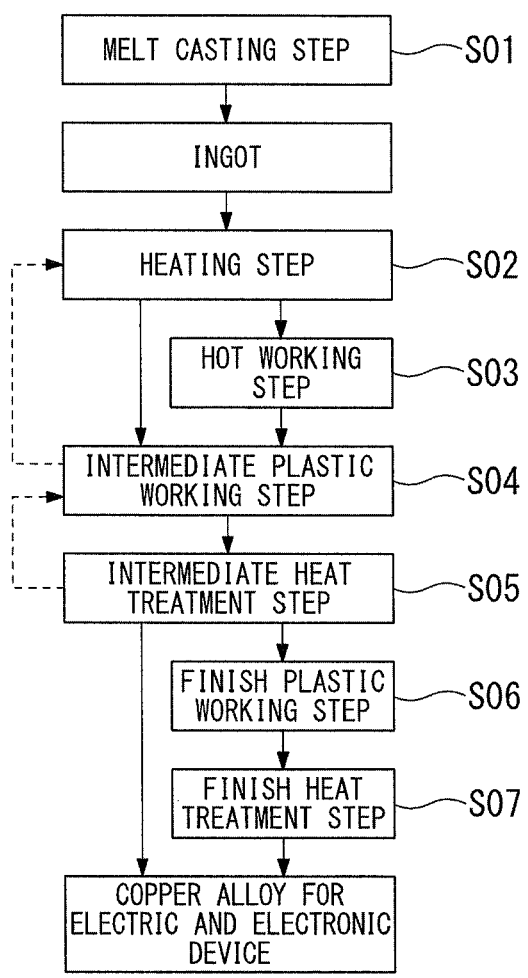

COPPER ALLOY FOR ELECTRIC AND ELECTRONIC DEVICE, COPPER ALLOY SHEET FOR ELECTRIC AND ELECTRONIC DEVICE, CONDUCTIVE COMPONENT FOR ELECTRIC AND ELECTRONIC DEVICE, AND TERMINAL

CROSS-REFERENCE TO RELATED PATENT APPLICATIONS

This application is a U.S. National Phase Application under 35 U.S.C. §371 of International Patent Application No. PCT/JP2013/084903, filed Dec. 26, 2013, and claims the benefit of Japanese Patent Applications No. 2012-288051, filed Dec. 28, 2012 and No. 2013-252331, filed Dec. 5, 2013, all of which are incorporated by reference in their entirety herein. The International Application was published in Japanese on Jul. 3, 2014 as International Publication No. WO/2014/104198 under PCT Article 21(2).

FIELD OF THE INVENTION

The present invention relates to a Cu—Zn—Sn-based copper alloy for electric and electronic devices, a copper alloy sheet for electric and electronic devices, a conductive component for electric and electronic devices, and a terminal using the same, the copper alloy being used as a conductive component for electric and electronic devices such as a connector of a semiconductor device, other terminals thereof, a movable contact of an electromagnetic relay, or a lead frame.

BACKGROUND OF THE INVENTION

As a material of a conductive component for electric and electronic device, a Cu—Zn alloy is widely used in the related art from the viewpoint of, for example, balance between strength, workability, and cost.

In addition, in the case of a terminal such as a connector, in order to improve reliability of contact with an opposite-side conductive member, a surface of a substrate (blank) formed of a Cu—Zn alloy is plated with tin (Sn). In a conductive component such as a connector obtained by plating a surface of a Cu—Zn alloy as a substrate with Sn, a Cu—Zn—Sn-based alloy may be used in order to improve the recycling efficiency of the Sn-plated substrate and the strength.

Here, typically, a conductive component for electric and electronic device such as a connector is manufactured by punching a sheet (rolled sheet) having a thickness of about 0.05 mm to 1.0 mm into a predetermined shape and bending at least a portion of the sheet. In this case, a peripheral portion around the bent portion is brought into contact with an opposite-side conductive member so as to obtain an electric connection with the opposite-side conductive member, and due to the spring properties of the bent portion, the contact state with the opposite-side conductive member is maintained.

It is preferable that a copper alloy for electric and electronic device used for a conductive component for electric and electronic device is superior in conductivity, rollability, and punchability. Further, as described above, in the case of the connector or the like in which the contact state between the peripheral portion around the bent portion and the opposite-side conductive member is maintained due to the spring properties of the bent portion obtained by bending, bendability and stress relaxation resistance are required to be superior.

For example, Patent Documents 1 to 3 disclose methods for improving the stress relaxation resistance of a Cu—Zn—Sn-based alloy.

Patent Document 1 describes that stress relaxation resistance can be improved by adding Ni to a Cu—Zn—Sn-based alloy to produce a Ni—P compound. In addition, Patent Document 1 describes that the addition of Fe is also efficient for improvement of stress relaxation resistance.

Patent Document 2 describes that strength, elasticity, and heat resistance can be improved by adding Ni and Fe to a Cu—Zn—Sn-based alloy together with P to produce a compound. The above-described improvement of strength, elasticity, and heat resistance implies improvement of stress relaxation resistance.

In addition, Patent Document 3 describes that stress relaxation resistance can be improved by adding Ni to a Cu—Zn—Sn-based alloy and adjusting a Ni/Sn ratio to be in a specific range. In addition, Patent Document 3 describes that the addition of a small amount of Fe is also efficient for improving stress relaxation resistance.

Further, Patent Document 4 targeted for a lead frame material describes that stress relaxation resistance can be improved by adding Ni and Fe to a Cu—Zn—Sn-based alloy together with P, adjusting an atomic ratio (Fe+Ni)/P to be in a range of 0.2 to 3, and producing a Fe—P-based compound, a Ni—P-based compound, and a Fe—Ni—P-based compound.

CITATION LIST

Patent Document

[Patent Document 1] Japanese Unexamined Patent Application, First Publication No. H5-33087
[Patent Document 2] Japanese Unexamined Patent Application, First Publication No. 2006-283060
[Patent Document 3] Japanese Patent No. 3953357
[Patent Document 4] Japanese Patent No. 3717321

Technical Problem

However, Patent Documents 1 and 2 consider only each content of Ni, Fe, and P, and the adjustment of each content cannot necessarily realize reliable and sufficient improvement of stress relaxation resistance.

In addition, Patent Document 3 discloses the adjustment of the Ni/Sn ratio but does not consider a relationship between a P compound and stress relaxation resistance at all. Therefore, sufficient and reliable improvement of stress relaxation resistance cannot be realized.

Further, Patent Document 4 only describes the adjustment of the total content of Fe, Ni, and P and the adjustment of the atomic ratio of (Fe+Ni)/P and cannot realize sufficient improvement of stress relaxation resistance.

As described above, with the methods disclosed in the related art, the stress relaxation resistance of a Cu—Zn—Sn-based alloy cannot be sufficiently improved. Therefore, in a connector or the like having the above-described structure, residual stress is relaxed over time or in a high-temperature environment, and contact pressure with an opposite-side conductive member is not maintained. As a result, there is a problem in that a problem such as contact failure is likely to occur in the early stages. In order to avoid such a problem, in the related art, the thickness of a material is inevitably increased, which causes an increase in material cost and weight.

Therefore, more reliable and sufficient improvement in stress relaxation resistance is strongly desired.

In addition, when a conductive component for electric and electronic device having a relatively large size such as a relay or a large terminal is manufactured, in many cases, punching is performed such that a longitudinal direction of a conductive component for electric and electronic device faces a direction parallel to a rolling direction of a rolled copper alloy sheet. As a result, in the large terminal and the like, bending is performed such that a bending axis is perpendicular to the rolling direction of the rolled copper alloy sheet.

Recently, along with a decrease in the weight of electric and electronic device, an attempt has been made to decrease the thickness of a conductive component such as a terminal (for example, a connector), a relay, or a lead frame used for the electric and electronic device. Therefore, in the terminal such as a connector, it is necessary that strict bending is performed to secure a contact pressure, and bendability is more necessary than before.

The present invention has been made in consideration of the above-described circumstances, and an object thereof is to provide a copper alloy for electric and electronic device, a copper alloy sheet for electric and electronic device, a conductive component for electric and electronic device, and a terminal using the same, in which the copper alloy is superior in stress relaxation resistance and balance between yield strength and bendability, has superior bendability when bent such that a bending axis is perpendicular to a rolling direction, and is suitable for a conductive component for electric and electronic device such as a terminal (for example, a connector), a relay, or a lead frame.

SUMMARY OF THE INVENTION

Solution to Problem

According to the present invention, there is provided a copper alloy for electric and electronic devices, the copper alloy comprising: more than 2.0 mass % to 15.0 mass % of Zn; 0.10 mass % to 0.90 mass % of Sn; 0.05 mass % to less than 1.00 mass % of Ni; 0.001 mass % to less than 0.100 mass % of Fe; 0.005 mass % to 0.100 mass % of P; and a remainder including Cu and unavoidable impurities, in which a ratio Fe/Ni of a Fe content to a Ni content satisfies $0.002 \leq Fe/Ni < 1.500$ by atomic ratio, a ratio (Ni+Fe)/P of a total content (Ni+Fe) of Ni and Fe to a P content satisfies $3.0 < (Ni+Fe)/P < 100.0$ by atomic ratio, a ratio Sn/(Ni+Fe) of a Sn content to the total content (Ni+Fe) of Ni and Fe satisfies $0.10 < Sn/(Ni+Fe) < 5.00$ by atomic ratio, and a yield ratio YS/TS is more than 90% which is calculated from a strength TS and a 0.2% yield strength YS when a tensile test is performed in a direction parallel to a rolling direction.

According to the copper alloy for electric and electronic device having the above-described configuration, Ni and Fe are added thereto together with P, and addition ratios between Sn, Ni, Fe, and P are limited. As a result, an [Ni,Fe]—P-based precipitate containing Fe, Ni, and P which is precipitated from a matrix is present in an appropriate amount. Therefore, stress relaxation resistance is sufficiently superior, strength (yield strength) is high, and bendability is also superior.

Here, the [Ni,Fe]—P-based precipitate refers to a ternary precipitate of Ni—Fe—P or a binary precipitate of Fe—P or Ni—P, and may include a multi-component precipitate containing the above-described elements and other elements, for example, major components such as Cu, Zn, and Sn and impurities such as O, S, C, Co, Cr, Mo, Mn, Mg, Zr, and Ti. In addition, the [Ni,Fe]—P-based precipitate is present in the form of a phosphide or a solid-solution alloy of phosphorus.

In addition, a yield ratio YS/TS is more than 90% which is calculated from a strength TS and a 0.2% yield strength YS when a tensile test is performed in a direction parallel to a rolling direction. Therefore, the 0.2% yield strength YS is set to be relatively higher than the strength TS. Accordingly, a balance between yield strength and bendability is improved, and bendability is superior when a bending axis is perpendicular to a rolling direction. As a result, as in the case of a relay or a large terminal, even when bending is performed such that a bending axis is perpendicular to a rolling direction of a rolled copper alloy sheet, cracking and the like can be suppressed.

According to another aspect of the present invention, there is provided a copper alloy for electric and electronic device, the copper alloy comprising: more than 2.0 mass % to 15.0 mass % of Zn; 0.10 mass % to 0.90 mass % of Sn; 0.05 mass % to less than 1.00 mass % of Ni; 0.001 mass % to less than 0.100 mass % of Fe; 0.001 mass % to less than 0.100 mass % of Co; 0.005 mass % to 0.100 mass % of P; and a remainder including Cu and unavoidable impurities, in which a ratio (Fe+Co)/Ni of a total content of Fe and Co to a Ni content satisfies $0.002 \leq (Fe+Co)/Ni < 1.500$ by atomic ratio, a ratio (Ni+Fe+Co)/P of a total content (Ni+Fe+Co) of Ni, Fe, and Co to a P content satisfies $3.0 < (Ni+Fe+Co)/P < 100.0$ by atomic ratio, a ratio Sn/(Ni+Fe+Co) of a Sn content to the total content (Ni+Fe+Co) of Ni, Fe, and Co satisfies $0.10 < Sn/(Ni+Fe+Co) < 5.00$ by atomic ratio, and a yield ratio YS/TS is more than 90% which is calculated from a strength TS and a 0.2% yield strength YS when a tensile test is performed in a direction parallel to a rolling direction.

According to the copper alloy for electric and electronic device having the above-described configuration, Ni, Fe, and Co are added thereto together with P, and addition ratios between Sn, Ni, Fe, Co, and P are appropriately limited. As a result, an [Ni,Fe,Co]—P-based precipitate containing Fe, Ni, Co, and P which is precipitated from a matrix is present in an appropriate amount, and the contents of H, O, S, and C which are gas impurity elements are suppressed to be appropriate amounts or lower. Therefore, stress relaxation resistance is sufficiently superior, strength (yield strength) is high, and bendability is also superior.

Here, the [Ni,Fe,Co]—P-based precipitate refers to a quaternary precipitate of Ni—Fe—Co—P, a ternary precipitate of Ni—Fe—P, Ni—Co—P, or Fe—Co—P, or a binary precipitate of Fe—P, Ni—P, or Co—P and may include a multi-component precipitate containing the above-described elements and other elements, for example, major components such as Cu, Zn, and Sn and impurities such as O, S, C, Cr, Mo, Mn, Mg, Zr, and Ti. In addition, the [Ni,Fe,Co]—P-based precipitate is present in the form of a phosphide or an solid-solution alloy containing phosphorus.

In addition, a yield ratio YS/TS is more than 90% which is calculated from a strength TS and a 0.2% yield strength YS when a tensile test is performed in a direction parallel to a rolling direction. Therefore, the 0.2% yield strength YS is set to be relatively higher than the strength TS. Accordingly, a balance between yield strength and bendability is improved, and bendability is superior when a bending axis is perpendicular to a rolling direction. As a result, as in the case of a relay or a large terminal, even when bending is performed such that a bending axis is perpendicular to a rolling direction of a rolled copper alloy sheet, cracking and the like can be suppressed.

Here, in the copper alloy for electric and electronic device according to the present invention, it is preferable that an average grain size is 50 μm or less.

As a result of investigating a relationship between the grain size and the yield ratio YS/TS, it was determined that the yield ratio YS/TS can be improved by decreasing the grain size. In the Cu—Zn—Sn-based alloy according to the present invention, by decreasing the average grain size to be 50 μm or less, the above-described yield ratio can be greatly improved to reliably exceed 90%.

In addition, in the copper alloy for electric and electronic device according to the present invention, it is preferable that the copper alloy has mechanical properties including a 0.2% yield strength of 300 MPa or higher.

The copper alloy for electric and electronic device, which has mechanical properties including the 0.2% yield strength of 300 MPa or higher, is suitable for a conductive component in which high strength is particularly required, for example, a movable contact of an electromagnetic relay or a spring portion of a terminal.

According to the present invention, there is provided a copper alloy sheet for electric and electronic device including: a rolled material formed of the above-described copper alloy for electric and electronic device, in which a thickness is in a range of 0.05 mm to 1.0 mm.

The copper alloy sheet for electric and electronic device having the above-described configuration can be suitably used for a connector, other terminals, a movable contact of an electromagnetic relay, or a lead frame.

Here, in the copper alloy sheet for electric and electronic device according to the present invention, a surface may be plated with Sn.

In this case, a substrate to be plated with Sn is formed of a Cu—Zn—Sn-based alloy containing 0.10 mass % to 0.90 mass % of Sn. Therefore, a component such as a connector after use can be collected as scrap of a Sn-plated Cu—Zn alloy, and superior recycling efficiency can be secured.

According to the present invention, there is provided a conductive component for electric and electronic device including: the above-described copper alloy for electric and electronic device.

Further, according to the present invention, there is provided a conductive component for electric and electronic device including: the above-described copper alloy sheet for electric and electronic device.

Examples of the conductive component for electric and electronic device according to the present invention include a terminal such as a connector, a relay, and a lead frame.

According to the present invention, there is provided a terminal for electric and electronic device including: the above-described copper alloy for electric and electronic device.

Further, according to the present invention, there is provided a terminal for electric and electronic device including: the above-described copper alloy sheet for electric and electronic device.

Examples of the terminal according to the present invention include a connector.

According to the conductive component for electric and electronic device and the terminal having the above-described configurations, stress relaxation resistance is superior. Therefore, residual stress is not likely to be relaxed over time or in a high-temperature environment. For example, when the conductive component and the terminal have a structure of coming into press contact with an opposite-side conductive member due to the spring properties of a bent portion, the contact pressure with the opposite-side conductive member can be maintained. Further, the yield ratio in the direction parallel to the rolling direction is more than 90%, and the balance between yield strength and bendability is good. Therefore, the conductive component and the terminal can be applied to, for example, a relay or a large terminal which is bent such that a bending axis is perpendicular to a rolling direction of the rolled copper alloy sheet.

Advantageous Effects of Invention

According to the present invention, it is possible to provide a copper alloy for electric and electronic device, a copper alloy sheet for electric and electronic device, a conductive component for electric and electronic device, and a terminal using the same, in which the copper alloy is superior in stress relaxation resistance and balance between yield strength and bendability, has superior bendability when bent such that a bending axis is perpendicular to a rolling direction, and is suitable for a conductive component for electric and electronic device such as a terminal (for example, a connector), a relay, or a lead frame.

BRIEF DESCRIPTION OF THE DRAWINGS

FIG. 1 is a flowchart showing a process example of a method of producing a copper alloy for electric and electronic device according to the present invention.

DETAILED DESCRIPTION OF THE INVENTION

Hereinafter, a copper alloy for electric and electronic devices according to an embodiment of the present invention will be described.

The copper alloy for electric and electronic devices according to the embodiment has a composition comprising: more than 2.0 mass % to 15.0 mass % of Zn; 0.10 mass % to 0.90 mass % of Sn; 0.05 mass % to less than 1.00 mass % of Ni; 0.001 mass % to less than 0.100 mass % of Fe; 0.005 mass % to 0.100 mass % of P; and a remainder including Cu and unavoidable impurities.

Content ratios between the respective alloy elements are determined such that a ratio Fe/Ni of a Fe content to a Ni content satisfies the following Expression (1) of $0.002 \leq Fe/Ni < 1.500$ by atomic ratio, a ratio (Ni+Fe)/P of a total content (Ni+Fe) of Ni and Fe to a P content satisfies the following Expression (2) of $3.0 < (Ni+Fe)/P < 100.0$ by atomic ratio, and a ratio Sn/(Ni+Fe) of a Sn content to the total content (Ni+Fe) of Ni and Fe satisfies the following Expression (3) of $0.10 < Sn/(Ni+Fe) < 5.00$ by atomic ratio.

Further, the copper alloy for electric and electronic device according to the embodiment may further include 0.001 mass % to less than 0.100 mass % of Co in addition to Zn, Sn, Ni, Fe, and P described above. Content ratios between the respective alloy elements are determined such that a ratio (Fe+Co)/Ni of a total content of Fe and Co to a Ni content satisfies the following Expression (1') of $0.002 \leq (Fe+Co)/Ni < 1.500$ by atomic ratio, a ratio (Ni+Fe+Co)/P of a total content (Ni+Fe+Co) of Ni, Fe, and Co to a P content satisfies the following Expression (2') of $3.0 < (Ni+Fe+Co)/P < 100.0$ by atomic ratio, and a ratio Sn/(Ni+Fe+Co) of a Sn content to the total content (Ni+Fe+Co) of Ni, Fe, and Co satisfies the following Expression (3') of $0.10 < Sn/(Ni+Fe+Co) < 5.00$ by atomic ratio.

Here, the reason for limiting the component composition as described above will be described.

(Zn: More than 2.0 Mass % to 15.0 Mass %)

Zn is a basic alloy element in the copper alloy, which is a target of the embodiment and is an efficient element for improving strength and spring properties. In addition, Zn is cheaper than Cu and thus has an effect of reducing the material cost of the copper alloy. When the Zn content is 2.0 mass % or less, the effect of reducing the material cost cannot be sufficiently obtained. On the other hand, when the Zn content exceeds 15.0 mass %, corrosion resistance decreases, and cold workability also decreases.

Therefore, in the embodiment, the Zn content is in a range of more than 2.0 mass % to 15.0 mass %. The Zn content is more preferably in a range of more than 3.0 mass % to 11.0 mass %.

(Sn: 0.10 Mass % to 0.90 Mass %)

Addition of Sn has an effect of improving strength and is advantageous for improving the recycling efficiency of a Sn-plated Cu—Zn alloy. Further, as a result of a study by the present inventors, it was found that the presence of Sn together with Ni and Fe contributes to the improvement of stress relaxation resistance. When the Sn content is less than 0.10 mass %, the above-described effects cannot be sufficiently obtained. On the other hand, when the Sn content is more than 0.90 mass %, hot workability and cold workability decrease. Therefore, cracking may occur during hot rolling or cold rolling, and conductivity may decrease.

Therefore, in the embodiment, the Sn content is in a range of 0.10 mass % to 0.90 mass %. The Sn content is more preferably in a range of 0.20 mass % to 0.80 mass %.

(Ni: 0.05 Mass % to Less than 1.00 Mass %)

By adding Ni together with Fe and P, a [Ni,Fe]—P-based precipitate can be precipitated from a matrix. In addition, by adding Ni together with Fe, Co, and P, a [Ni,Fe,Co]—P-based precipitate can be precipitated from a matrix. The [Ni,Fe]—P-based precipitate or the [Ni,Fe,Co]—P-based precipitate has an effect of pinning grain boundaries during recrystallization. As a result, the average grain size can be reduced, and strength, bendability, and stress corrosion cracking resistance can be improved. Further, due to the presence of the precipitate, stress relaxation resistance can be significantly improved. Further, by allowing Ni to be present together with Sn, Fe, Co, and P, stress relaxation resistance can be improved due to solid solution strengthening. Here, when the addition amount of Ni is less than 0.05 mass %, stress relaxation resistance cannot be sufficiently improved. On the other hand, when the addition amount of Ni is 1.00 mass % or more, the solid solution amount of Ni increases, and, conductivity decreases. In addition, due to an increase in the amount of an expensive Ni material used, the cost increases.

Therefore, in the embodiment, the Ni content is in a range of 0.05 mass % to less than 1.00 mass %. The Ni content is more preferably in a range of 0.20 mass % to less than 0.80 mass %.

(Fe: 0.001 Mass % to Less than 0.100 Mass %)

By adding Fe together with Ni and P, a [Ni,Fe]—P-based precipitate can be precipitated from a matrix. In addition, by adding Fe together with Ni, Co, and P, a [Ni,Fe,Co]—P-based precipitate can be precipitated from a matrix. The [Ni,Fe]—P-based precipitate or the [Ni,Fe,Co]—P-based precipitate has an effect of pinning grain boundaries during recrystallization. As a result, the average grain size can be reduced, and strength, bendability, and stress corrosion cracking resistance can be improved. Further, due to the presence of the precipitate, stress relaxation resistance can be significantly improved. Here, when the addition amount of Fe is less than 0.001 mass %, the effect of pinning grain boundaries cannot be sufficiently obtained, and sufficient strength cannot be obtained. On the other hand, when the addition amount of Fe is 0.100 mass % or more, further improvement of strength cannot be recognized, the solid solution amount of Fe increases, and conductivity decreases. In addition, cold workability decreases.

Therefore, in the embodiment, the Fe content is in a range of 0.001 mass % to less than 0.100 mass %. The Fe content is more preferably in a range of 0.002 mass % to 0.080 mass %.

(Co: 0.001 Mass % to Less than 0.100 Mass %)

Co is not an essential addition element. However, when a small amount of Co is added together with Ni, Fe, and P, a [Ni,Fe,Co]—P-based precipitate is produced, and stress relaxation resistance can be further improved. Here, when the addition amount of Co is less than 0.001 mass %, the effect of further improving stress relaxation resistance obtained by the addition of Co cannot be obtained. On the other hand, when the addition amount of Co is 0.100 mass % or more, the solid solution amount of Co increases, and conductivity decreases. In addition, due to an increase in the amount of an expensive Co material used, the cost increases.

Therefore, in the embodiment, when Co is added, the Co content is in a range of 0.001 mass % to less than 0.100 mass %. The Co content is more preferably in a range of 0.002 mass % to 0.080 mass %.

When Co is not actively added, less than 0.001 mass % of Co is contained as an impurity.

(P: 0.005 Mass % to 0.100 Mass %)

P has high bonding properties with Fe, Ni, and Co. When an appropriate amount of P is added together with Fe and Ni, a [Ni,Fe]—P-based precipitate can be precipitated. In addition, when an appropriate amount of P is added together with Fe, Ni, and Co, a [Ni,Fe,Co]—P-based precipitate can be precipitated. Further, due to the presence of the precipitate, stress relaxation resistance can be improved. When the P content is less than 0.005 mass %, it is difficult to precipitate a sufficient amount of the [Ni,Fe]—P-based precipitate or the [Ni,Fe,Co]—P-based precipitate, and stress relaxation resistance cannot be sufficiently improved. On the other hand, when the P content exceeds 0.100 mass %, the solid solution amount of P increases, conductivity decreases, rollability decreases, and cold rolling cracking is likely to occur.

Therefore, in the embodiment, the P content is in a range of 0.005 mass % to 0.100 mass %. The P content is more preferably in a range of 0.010 mass % to 0.080 mass %.

P is an element which is likely to be unavoidably incorporated into molten raw materials of the copper alloy. Accordingly, in order to limit the P content to be as described above, it is desirable to appropriately select the molten raw materials.

Basically, the remainder of the above-described elements may include Cu and unavoidable impurities. Examples of the unavoidable impurities include Mg, Al, Mn, Si, (Co), Cr, Ag, Ca, Sr, Ba, Sc, Y, Hf, V, Nb, Ta, Mo, W, Re, Ru, Os, Se, Te, Rh, Ir, Pd, Pt, Au, Cd, Ga, In, Li, Ge, As, Sb, Ti, Tl, Pb, Bi, S, O, C, Be, N, H, Hg, B, Zr, and rare earth elements.

The total content of the unavoidable impurities is preferably 0.3 mass % or less.

Further, in the copper alloy for electric and electronic device according to the embodiment, it is important not only to adjust each content of the alloy elements but also to limit the ratios between the respective content of the elements such that the above-described Expressions (1) to (3) or Expressions (1') to (3') are satisfied by atomic ratio. Therefore, the reason for limiting the ratios to satisfy Expressions (1) to (3) or Expressions (1') to (3') will be described below.

$$0.002 \leq \text{Fe/Ni} < 1.500 \quad \text{Expression (1):}$$

As a result of a detailed experiment, the present inventors found that sufficient improvement of stress relaxation resistance can be realized not only by adjusting each content of Fe and Ni but also by limiting the ratio Fe/Ni to be in a range of 0.002 to less than 1.500 by atomic ratio. Here, when the ratio Fe/Ni is 1.500 or more, stress relaxation resistance decreases. When the ratio Fe/Ni is less than 0.002, strength decreases, and the amount of an expensive Ni material used is relatively increased, which causes an increase in cost. Therefore, the ratio Fe/Ni is limited to be in the above-described range. The Fe/Ni ratio is more preferably in a range of 0.002 to 1.000 and still more preferably in a range of 0.005 to 0.500.

$$3.0 < (\text{Ni+Fe})/\text{P} < 100.0 \quad \text{Expression (2):}$$

When the ratio (Ni+Fe)/P is 3.0 or less, stress relaxation resistance decreases along with an increase in the ratio of solid-solution element P. Concurrently, conductivity decreases due to the solid-solution element P, rollability decreases, and thus cold rolling cracking is likely to occur. Further, bendability decreases. On the other hand, when the ratio (Ni+Fe)/P is 100.0 or more, conductivity decreases along with an increase in the ratio of solid-solution elements Ni and Fe, and the amount of an expensive Ni material used is relatively increased, which causes an increase in cost. Therefore, the ratio (Ni+Fe)/P is limited to be in the above-described range. The upper limit of the ratio (Ni+Fe)/P is 50.0 or less, preferably 40.0 or less, more preferably 20.0 or less, still more preferably less than 15.0, and most preferably 12.0 or less.

$$0.10 < \text{Sn}/(\text{Ni+Fe}) < 5.00 \quad \text{Expression (3):}$$

When the ratio Sn/(Ni+Fe) is 0.10 or less, the effect of improving stress relaxation resistance cannot be sufficiently exhibited. On the other hand, when the ratio Sn/(Ni+Fe) is 5.00 or more, the (Ni+Fe) content is relatively decreased, the amount of a [Ni,Fe]—P-based precipitate decreases, and stress relaxation resistance decreases. Therefore, the ratio Sn/(Ni+Fe) is limited to be in the above-described range. The lower limit of the Sn/(Ni+Fe) is 0.20 or more, preferably 0.25 or more, and most preferably more than 0.30. The upper limit of the ratio Sn/(Ni+Fe) is 2.50 or less and preferably 1.50 or less.

$$0.002 \leq (\text{Fe+Co})/\text{Ni} < 1.500 \quad \text{Expression (1'):}$$

When Co is added, it can be considered that a portion of Fe is substituted with Co, and Expression (1') basically corresponds to Expression (1). Here, when the ratio (Fe+Co)/Ni is 1.500 or more, stress relaxation resistance decreases, and the amount of an expensive Co material used increases, which causes an increase in cost. When the ratio (Fe+Co)/Ni is less than 0.002, strength decreases, and the amount of an expensive Ni material used is relatively increased, which causes an increase in cost. Therefore, the ratio (Fe+Co)/Ni is limited to be in the above-described range. The (Fe+Co)/Ni ratio is more preferably in a range of 0.002 to 1.000 and still more preferably in a range of 0.005 to 0.500.

$$3.0 < (\text{Ni+Fe+Co})/\text{P} < 100.0 \quad \text{Expression (2'):}$$

Expression (2'), which expresses the case where Co is added, corresponds to Expression (2). When the ratio (Ni+Fe+Co)/P is 3.0 or less, stress relaxation resistance decreases along with an increase in the ratio of solid-solution element P. Concurrently, conductivity decreases due to the solid-solution element P, rollability decreases, and thus cold rolling cracking is likely to occur. Further, bendability decreases. On the other hand, when the ratio (Ni+Fe+Co)/P is 100.0 or more, conductivity decreases along with an increase in the ratio of solid-solution elements Ni, Fe, and Co, and the amount of an expensive Co or Ni material used is relatively increased, which causes an increase in cost. Therefore, the ratio (Ni+Fe+Co)/P is limited to be in the above-described range. The upper limit of the ratio (Ni+Fe+Co)/P is 50.0 or less, preferably 40.0 or less, more preferably 20.0 or less, still more preferably less than 15.0, and most preferably 12.0 or less.

$$0.10 < \text{Sn}/(\text{Ni+Fe+Co}) < 5.00 \quad \text{Expression (3'):}$$

Expression (3'), which expresses the case where Co is added, corresponds to Expression (3). When the ratio Sn/(Ni+Fe+Co) is 0.10 or less, the effect of improving stress relaxation resistance cannot be sufficiently exhibited. On the other hand, when the ratio Sn/(Ni+Fe+Co) is 5.0 or more, the (Ni+Fe+Co) content is relatively decreased, the amount of a [Ni,Fe,Co]—P-based precipitate decreases, and stress relaxation resistance decreases. Therefore, the ratio Sn/(Ni+Fe+Co) is limited to be in the above-described range. The lower limit of the Sn/(Ni+Fe+Co) is 0.20 or more, preferably 0.25 or more, and most preferably more than 0.30. The upper limit of the ratio Sn/(Ni+Fe+Co) is 2.50 or less and preferably 1.50 or less.

In the copper alloy for electric and electronic device in which not only each content of the respective alloy elements but also the ratios between the elements are adjusted so as to satisfy Expressions (1) to (3) or Expressions (1') to (3'), a [Ni,Fe]—P-based precipitate or a [Ni,Fe,Co]—P-based precipitate is dispersed and precipitated from a matrix. It is presumed that, due to the dispersion and precipitation of the precipitate, stress relaxation resistance is improved.

Further, in the copper alloy for electric and electronic device according to the embodiment, the presence of the [Ni,Fe]—P-based precipitate or the [Ni,Fe,Co]—P-based precipitate is important. As a result of a study by the present inventors, it was found that the precipitate is a hexagonal crystal (space group: P-62 m (189)) having a $Fe_2P$-based or $Ni_2P$-based crystal structure, or a $Fe_2P$-based orthorhombic crystal (space group: P-nma (62)). It is preferable that the precipitate have a fine average grain size of 100 nm or less. Due to the presence of the precipitate having a fine grain size, superior stress relaxation resistance can be secured, and strength and bendability can be improved through grain refinement. Here, when the average grain size of the precipitate exceeds 100 nm, contribution to the improvement of strength and stress relaxation resistance decreases. In addition, although not limited, the lower limit of the average grain size of the precipitate is preferably 1 nm.

In addition, in the copper alloy for electric and electronic device according to the embodiment, the average grain size of the structure is preferably 50 μm or less and more preferably in a range of 0.1 μm to 50 μm. When the average grain size is 50 μm or less, the following yield ratio can be improved.

In the copper alloy for electric and electronic device according to the embodiment, the component composition is adjusted as described above, and mechanical properties are defined as described below.

That is, a yield ratio YS/TS is more than 90% which is calculated from a strength TS and a 0.2% yield strength YS when a tensile test is performed in a direction parallel to a rolling direction.

Here, the reason for defining the yield ratio in the direction parallel to the rolling direction as described above will be described below.

(Yield Ratio)

A yield ratio YS/TS is more than 90% which is calculated from a strength TS and a 0.2% yield strength YS when a tensile test is performed in a direction parallel to a rolling direction. Therefore, the 0.2% yield strength YS is set to be relatively higher than the strength TS. Bendability is a problem of destruction and has a strong correlation with strength. Therefore, when the 0.2% yield strength is relatively higher than the strength, a balance between yield strength and bendability is improved, and bendability is superior.

Here, in order to reliably exhibit the above-described effects, the yield ratio is preferably 92% or more and more preferably 93% or more. Although not limited, the upper limit of the yield ratio is preferably 99%.

Next, a preferable example of a method of producing the above-described copper alloy for electric and electronic device according to the embodiment will be described with reference to a flowchart shown FIG. 1.

[Melt Casting Step: S01]

First, molten copper alloy having the above-described component composition is prepared. As a copper material, 4NCu (for example, oxygen-free copper) having a purity of 99.99 mass % or higher is preferably used, and scrap may also be used as the material. As a material containing an addition element, a material having a purity of 99% or higher is preferably used, and a mother alloy or scrap containing an addition element may be used as the material. In addition, for melting, an air atmosphere furnace may be used. However, in order to suppress oxidation of an addition element, an atmosphere furnace having an inert gas atmosphere or a reducing atmosphere may be used.

Next, the molten copper alloy with the components adjusted is cast into an ingot using an appropriate casting method such as a batch type casting method (for example, metal mold casting), a continuous casting method, or a semi-continuous casting method.

[Heating Step: S02]

Next, optionally, a homogenization heat treatment is performed to eliminate segregation of the ingot and homogenize the ingot structure. Alternatively, a solution heat treatment is performed to solid-solute a crystallized product or a precipitate. Heat treatment conditions are not particularly limited. Typically, heating may be performed at 600° C. to 1000° C. for 1 second to 24 hours. When the heat treatment temperature is lower than 600° C. or when the heat treatment time is shorter than 5 minutes, a sufficient effect of homogenizing or solutionizing may not be obtained. On the other hand, when the heat treatment temperature exceeds 1000° C., a segregated portion may be partially melted. When the heat treatment time exceeds 24 hours, the cost increases. Cooling conditions after the heat treatment may be appropriately determined. Typically, water quenching may be performed. After the heat treatment, surface polishing may be performed.

[Hot Working: S03]

Next, hot working may be performed on the ingot to optimize rough processing and homogenize the structure. Hot working conditions are not particularly limited. Typically, it is preferable that the start temperature is 600° C. to 1000° C., the end temperature is 300° C. to 850° C., and the working ratio is about 10% to 99%. Until the start temperature of the hot working, ingot heating may be performed as the above-described heating step S02. Cooling conditions after the hot working may be appropriately determined. Typically, water quenching may be performed. After the hot working, surface polishing may be performed. A working method of the hot working is not particularly limited. For example, rolling, drawing, extrusion, groove rolling, forging, or pressing can be adopted.

[Intermediate Plastic Working: S04]

Next, intermediate plastic working is performed on the ingot which undergoes the homogenization treatment in the heating step S02 or the hot working material which undergoes the hot working S03 such as hot rolling. In the intermediate plastic working S04, temperature conditions are not particularly limited and are preferably in a range of −200° C. to +200° C. of a cold or warm working temperature. The working ratio of the intermediate plastic working is not particularly limited and is typically about 10% to 99%. An intermediate plastic working method is not particularly limited. For example, rolling, drawing, extrusion, groove rolling, forging, or pressing can be adopted. S02 to S04 may be repeated to strictly perform solutionizing.

[Intermediate Heat Treatment Step: S05]

After the intermediate plastic working S04 at a cold or warm working temperature, an intermediate heat treatment is performed as a recrystallization treatment and a precipitation treatment. This intermediate heat treatment is performed not only to recrystallize the structure but also to disperse and precipitate a [Ni,Fe]—P-based precipitate or a [Ni,Fe,Co]—P-based precipitate. Conditions of the heating temperature and the heating time may be adopted to produce the precipitate. Typically, the conditions may be 200° C. to 800° C. and 1 second to 24 hours. However, the grain size affects stress relaxation resistance to some extent. Therefore, it is preferable that the grain size of crystal grains recrystallized by the intermediate heat treatment is measured to appropriately select conditions of the heating temperature and the heating time. The intermediate heat treatment and the subsequent cooling affect the final average grain size. Therefore, it is preferable that the conditions are selected such that the average grain size is in a range of 0.1 μm to 50 μm.

As a specific method of the intermediate heat treatment, a method using a batch type heating furnace or a continuous heating method using a continuous annealing line may be used. When the batch type heating furnace is used, it is preferable that heating is performed at a temperature of 300° C. to 800° C. for 5 minutes to 24 hours. In addition, when the continuous annealing line is used, it is preferable that the heating maximum temperature is set as 250° C. to 800° C., and the temperature is not kept or only kept for about 1 second to 5 minutes in the above temperature range. In addition, it is preferable that the atmosphere of the intermediate heat treatment is a non-oxidizing atmosphere (nitrogen gas atmosphere, inert gas atmosphere, reducing atmosphere).

Cooling conditions after the intermediate heat treatment are not particularly limited. Typically, cooling may be performed at a cooling rate of 2000° C./sec to 100° C./h.

Optionally, the intermediate plastic working S04 and the intermediate heat treatment S05 may be repeated multiple times.

[Finish Plastic Working: S06]

After the intermediate heat treatment step S05, finish working is performed to obtain a copper alloy having a final dimension (thickness, width, and length) and a final shape. The working ratio may be appropriately selected according to the final thickness and the final shape and is preferably in a range of 1% to 99% and more preferably in a range of 1% to 70%. When the working ratio is less than 1%, an effect of improving yield strength cannot be sufficiently obtained. On the other hand, when the working ratio exceeds 70%, the recrystallized structure is lost, and a worked structure is obtained. As a result, bendability may decrease. The working ratio is preferably 1% to 70% and more preferably 5% to 70%. After finish plastic working, the resultant may be used as a product without any change. However, typically, it is preferable that finish heat treatment is further performed.

In the copper alloy for electric and electronic device according to the embodiment, "rolling direction" refers to a direction in which rolling is performed in the final finish plastic working S06.

[Finish Heat Treatment Step: S07]

After the finish plastic working, optionally, a finish heat treatment step S07 is performed to improve stress relaxation resistance and perform low-temperature annealing curing or to remove residual strain. It is preferable that this finish heat treatment is performed in a temperature range of 50° C. to 800° C. for 0.1 seconds to 24 hours. When the finish heat treatment temperature is lower than 50° C. or when the finish heat treatment time is shorter than 0.1 seconds, a sufficient straightening effect may not be obtained. On the other hand, when the finish heat treatment temperature exceeds 800° C., recrystallization may occur. When the finish heat treatment time exceeds 24 hours, the cost increases. When the finish plastic working S06 is not performed, the finish heat treatment step S07 can be omitted from the method of producing the copper alloy.

Through the above-described steps, the copper alloy for electric and electronic device according to the embodiment can be obtained. In the copper alloy for electric and electronic device, the 0.2% yield strength is 300 MPa or higher.

In addition, when rolling is used as a working method, a copper alloy sheet (strip) for electric and electronic device having a thickness of about 0.05 mm to 1.0 mm can be obtained. This sheet may be used as the conductive component for electric and electronic device without any change. However, typically, a single surface or both surfaces of the sheet are plated with Sn to have a thickness of 0.1 μm to 10 μm, and this Sn-plated copper alloy strip is used as a conductive component for electric and electronic device such as a connector or other terminals.

In this case, a Sn-plating method is not particularly limited. In addition, in some cases, a reflow treatment may be performed after electroplating.

As described above, in the copper alloy for electric and electronic device having the above-described configuration, a [Ni,Fe]—P-based precipitate containing Fe, Ni, and P or a [Ni,Fe,Co]—P-based precipitate which is precipitated from a matrix is present in an appropriate amount. Therefore, stress relaxation resistance is sufficiently superior, strength (yield strength) is high, and bendability is also superior.

In the copper alloy for electric and electronic device according to the embodiment, a yield ratio YS/TS is more than 90% which is calculated from a strength TS and a 0.2% yield strength YS when a tensile test is performed in a direction parallel to a rolling direction. Therefore, the 0.2% yield strength YS is set to be higher than the strength TS. Accordingly, a balance between yield strength and bendability is improved, and bendability is superior when a bending axis is perpendicular to a rolling direction. As a result, as in the case of a relay or a large terminal, even when bending is performed such that a bending axis is perpendicular to a rolling direction of a rolled copper alloy sheet, cracking and the like can be suppressed.

Further, the copper alloy for electric and electronic device according to the embodiment has mechanical properties including a 0.2% yield strength of 300 MPa or higher and thus is suitable for a conductive component in which high strength is particularly required, for example, a movable contact of an electromagnetic relay or a spring portion of a terminal.

In addition, the copper alloy sheet for electric and electronic device according to the embodiment includes a rolled material formed of the above-described copper alloy for electric and electronic device. Therefore, the copper alloy sheet for electric and electronic device having the above-described configuration has superior stress relaxation resistance and can be suitably used for a connector, other terminals, a movable contact of an electromagnetic relay, or a lead frame.

In addition, when the surface of the copper alloy sheet is plated with Sn, a component such as a connector after use can be collected as scrap of a Sn-plated Cu—Zn alloy, and superior recycling efficiency can be secured.

Hereinabove, the embodiment of the present invention has been described. However, the present invention is not limited to the embodiment, and appropriate modifications can be made within a range not departing from the technical scope of the present invention.

For example, the example of the production method has been described, but the present invention is not limited thereto. The production method is not particularly limited as long as a copper alloy for electric and electronic device as a final product has a composition in the range according to the present invention, and a yield ratio YS/TS is more than 90% which is calculated from a strength TS and a 0.2% yield strength YS when a tensile test is performed in a direction parallel to a rolling direction.

EXAMPLES

Hereinafter, the results of an experiment which were performed in order to verify the effects of the present invention will be shown as Examples of the present invention together with Comparative Examples. The following Examples are to describe the effects of the present invention, and configurations, processes, and conditions described in Examples do not limit the technical scope of the present invention.

Raw materials including a Cu-40% Zn master alloy and oxygen-free copper (ASTM B152 C10100) having a purity of 99.99 mass % or more were prepared. These raw materials were charged into a high-purity graphite melting pot and were melted using an electric furnace in an $N_2$ gas atmosphere. Various additional elements were added to the molten copper alloy to prepare molten alloys having component compositions shown in Tables 1, 2, 3, and 4, and the molten alloys were cast into a carbon mold to make ingots. The size of the ingots was about 40 mm (thickness)×about 50 mm (width)×about 200 mm (length).

Next, as a homogenization treatment (heating step S02), the ingots were held in an Ar gas atmosphere at 800° C. for a predetermined amount of time and then were water-quenched.

Next, hot rolling was performed as the hot working S03. Each of the ingots was reheated such that the hot rolling start temperature was 800° C., was hot-rolled at a rolling reduction of 50% such that a width direction of the ingot was a rolling direction, and was water-quenched such that the rolling end temperature was 300° C. to 700° C. Next, the ingot was cut, and surface polishing was performed. As a result, a hot-rolled material having a size of about 15 mm (thickness)×about 160 mm (width)×about 100 mm (length).

Next, the intermediate plastic working S04 and the intermediate heat treatment step S05 were performed once or were repeatedly performed twice.

Specifically, when the intermediate plastic working and the intermediate heat treatment were performed once, cold rolling (intermediate plastic working) was performed at a rolling reduction of 90% or more. Next, as the intermediate heat treatment for recrystallization and precipitation treatment, a heat treatment was performed at 200° C. to 800° C. for a predetermined amount of time, and then water quenching was performed. Next, the rolled material was cut, and surface polishing was performed to remove an oxide film.

On the other hand, when the intermediate plastic working and the intermediate heat treatment were repeated twice, primary cold rolling (primary intermediate plastic working) was performed at a rolling reduction of about 50% to 90%. Next, as a primary intermediate heat treatment, a heat treatment was performed at 200° C. to 800° C. for a predetermined amount of time, and water quenching was performed. Next, secondary cold rolling (secondary intermediate plastic working) was performed at a rolling reduction of about 50% to 90%, a secondary intermediate heat treatment was performed at 200° C. to 800° C. for a predetermined amount of time. Next, the rolled material was cut, and surface polishing was performed to remove an oxide film.

Next, finish rolling (finish plastic working S06) was performed at a rolling reduction as shown in Tables 5, 6, 7, and 8.

Finally, as the finish heat treatment step S07, a heat treatment was performed at 150° C. to 400° C., water quenching was performed, and cutting and surface-polishing were performed. As a result, a strip for characteristic evaluation having a size of 0.25 mm (thickness)×about 160 mm (width) was prepared.

Regarding the strip for characteristic evaluation, average grain size, conductivity, mechanical properties (yield strength, strength, and yield ratio), bendability, and stress relaxation resistance were evaluated. Test methods and measurement methods for each evaluation item are as follows, and the results thereof are shown in Tables 5, 6, 7, and 8.

[Grain Size Observation]

When the average grain size exceeded 10 μm, a surface perpendicular to the normal direction with respect to a rolling surface, that is, a ND (Normal Direction) surface was used as an observation surface. The ND surface was mirror-polished and etched, was imaged using an optical microscope such that the rolling direction was a horizontal direction of an image, and was observed in a visual field (about 300×200 μm$^2$) of 1000 times. In order to obtain the grain size, five line segments having predetermined horizontal and vertical lengths were drawn in the image according to a cutting method of JIS H 0501:1986 (corresponding to ISO 2624:1973), the number of crystal grains which were completely cut was counted, and the average value of the cut lengths thereof was calculated as the average grain size.

When the average grain size was 10 μm or less, a surface perpendicular to the normal direction with respect to a rolling surface, that is, a ND (Normal Direction) surface was used as an observation surface. Using an EBSD measurement device and an OIM analysis software, grain boundaries and an orientation difference distribution were measured.

Mechanical polishing was performed using waterproof abrasive paper and diamond abrasive grains, and finish polishing was performed using a colloidal silica solution. Using an EBSD measurement device (QUANTA FEG 450 manufactured by FEI Company, OIM DATA COLLECTION manufactured by EDAX/TSL (at present, AMETEK Inc.)) and an analysis software (OIM DATA ANALYSIS Ver. 5.3 manufactured by EDAX/TSL (at present, AMETEK Inc.)), an orientation differences between crystal grains was analyzed under conditions of an acceleration voltage of electron beams of 20 kV, a measurement interval of 0.1 μm step, and a measurement area of 1000 μm$^2$ or more. CI values of the measurement points were calculated from the analysis software OIM, and CI values of 0.1 or less were excluded by the analysis of the grain size. Grain boundaries were divided into a high-angle grain boundary and a low-angle grain boundary, in which, as a result of two-dimensional cross-sectional observation, the high-angle grain boundary had an orientation difference of 150 or more between two adjacent crystal grains, and the low-angle grain boundary had an orientation difference of 2° to 15° between two adjacent crystal grains. Using the high-angle grain boundary, a grain boundary map was created. Five line segments having predetermined horizontal and vertical lengths were drawn in the image according to a cutting method of JIS H 0501, the number of crystal grains which were completely cut was counted, and the average value of the cut lengths thereof was calculated as the average grain size.

[Conductivity]

A specimen having a size of 10 mm (width)×60 mm (length) was collected from the strip for characteristic evaluation, and the electrical resistance thereof was obtained using a four-terminal method. In addition, using a micrometer, the size of the specimen was measured, and the volume of the specimen was calculated. The conductivity was calculated from the measured electrical resistance and the volume. The specimen was collected such that a longitudinal direction thereof was parallel to the rolling direction of the strip for characteristic evaluation.

[Mechanical Properties]

A No. 13B specified in JIS Z 2241:2011 (based on ISO 6892-1:2009) was collected from the strip for characteristic evaluation, and the 0.2% yield strength, the strength TS, and the yield ratio YS/TS thereof were calculated using an offset method according to JIS Z 2241. The specimen was collected such that a tensile direction of a tensile test was parallel to the rolling direction of the strip for characteristic evaluation.

[Bendability]

Bending was performed according to a test method of JCBA (Japan Copper and Brass Association) T307-2007-4. W bending was performed such that a bending axis was perpendicular to a rolling direction. Multiple specimens having a size of 10 mm (width)×30 mm (length)×0.25 mm (thickness) were collected from the strip for characteristic evaluation. Next, a W-bending test was performed using a W-shaped jig having a bending angle of 90° and a bending radius of 0.125 mm by putting a W-shaped upper die of the jig on the specimen placed on a W-shaped lower die of the jig to apply a load thereto. A cracking test was performed using three samples. A case where no cracks were observed in four visual fields of each sample was evaluated as "O", and a case where cracks were observed in one or more visual fields of each sample was evaluated as "X".

[Stress Relaxation Resistance]

In a stress relaxation resistance test, using a method of applying a displacement to a free end of a specimen with one end supported as a fixed end, a stress was applied to the specimen, the specimen was held under the following conditions (temperature and time), and then a residual stress ratio thereof was measured, the method being specified in a cantilever screw method of JCBA (Japan Copper and Brass Association)-T309:2004.

In the test method, a specimen (width: 10 mm) was collected from each of the strips for characteristic evaluation in a direction parallel to the rolling direction. An initial deflection displacement was set as 2 mm, and the span length was adjusted such that a surface maximum stress of the specimen was 80% of the yield strength. The surface maximum stress was determined from the following expression.

$$\text{Surface Maximum Stress (MPa)} = 1.5 E t \delta_0 / L_s^2$$

(wherein E: deflection coefficient (MPa), t: thickness of sample (t=0.25 mm), $\delta_0$: initial deflection displacement (2 mm), $L_s$: span length (mm))

The stress relaxation resistance was evaluated by measuring a residual stress ratio from a bending behavior after holding at a temperature of 150° C. for 1000 h. The residual stress ratio was calculated using the following expression.

$$\text{Residual Stress Ratio (\%)} = (1 - \delta_t/\delta_0) \times 100$$

(wherein $\delta_t$: permanent deflection displacement (mm) after holding at 150° C. for 1000 h-permanent deflection displacement (mm) after holding at room temperature for 24 h, $\delta_0$: initial deflection displacement (mm))

A case where the residual stress ratio was 70% or more was evaluated as "O", and a case where the residual stress ratio was less than 70% was evaluated as "X".

Nos. 1 to 3, Nos. 28 to 29, and No. 32 are examples of the present invention in which a Cu-15 Zn alloy containing slightly lower than 15.0 mass % of Zn was based. Nos. 4 to 16, No. 30, and Nos. 33 to 36 are examples of the present invention in which a Cu-10 Zn alloy containing about 10.0 mass % of Zn was based. Nos. 17 to 26 and Nos. 37 to 39 are examples of the present invention in which a Cu-5 Zn alloy containing about 5.0 mass % of Zn was based. No. 27 and No. 31 are examples of the present invention in which a Cu-3 Zn alloy containing about 3.0 mass % of Zn was based.

In addition, Nos. 51 and 52 are comparative examples in which Zr content exceeded the upper limit of the range according to the present invention. Further, Nos. 53 to 57 are comparative examples in which a Cu-15 Zn alloy containing slightly lower than 15.0 mass % of Zn was based. No. 58 is a comparative example in which a Cu-5 Zn alloy containing about 5.0 mass % of Zn was based.

TABLE 1

[Examples of Present Invention]

| | Alloy Component Composition | | | | | | | Atomic Ratios of Alloy Elements | | |
|---|---|---|---|---|---|---|---|---|---|---|
| | Addition Elements (mass %) | | | | | | | Atomic Ratio | Atomic Ratio | Atomic Ratio |
| No. | Zn | Sn | Ni | Fe | P | Co | Cu | (Fe + Co)/Ni | (Ni + Fe + Co)/P | Sn/(Ni + Fe + Co) |
| 1 | 14.9 | 0.67 | 0.50 | 0.020 | 0.050 | — | Remainder | 0.042 | 5.5 | 0.64 |
| 2 | 14.9 | 0.67 | 0.50 | 0.020 | 0.050 | — | Remainder | 0.042 | 5.5 | 0.64 |
| 3 | 14.9 | 0.67 | 0.50 | 0.020 | 0.050 | — | Remainder | 0.042 | 5.5 | 0.64 |
| 4 | 8.8 | 0.62 | 0.56 | 0.021 | 0.049 | — | Remainder | 0.039 | 6.3 | 0.53 |
| 5 | 8.7 | 0.62 | 0.57 | 0.022 | 0.040 | — | Remainder | 0.041 | 7.8 | 0.52 |
| 6 | 10.5 | 0.26 | 0.38 | 0.017 | 0.062 | — | Remainder | 0.047 | 3.4 | 0.32 |
| 7 | 9.2 | 0.86 | 0.51 | 0.028 | 0.058 | — | Remainder | 0.058 | 4.9 | 0.79 |
| 8 | 11.0 | 0.56 | 0.13 | 0.057 | 0.032 | — | Remainder | 0.461 | 3.1 | 1.46 |
| 9 | 10.5 | 0.66 | 0.87 | 0.028 | 0.055 | — | Remainder | 0.034 | 8.6 | 0.36 |
| 10 | 8.5 | 0.50 | 0.58 | 0.002 | 0.053 | — | Remainder | 0.004 | 5.8 | 0.42 |
| 11 | 9.3 | 0.53 | 0.46 | 0.001 | 0.052 | — | Remainder | 0.002 | 4.7 | 0.57 |
| 12 | 10.0 | 0.56 | 0.60 | 0.008 | 0.055 | — | Remainder | 0.014 | 5.8 | 0.46 |
| 13 | 10.3 | 0.70 | 0.73 | 0.015 | 0.085 | — | Remainder | 0.022 | 4.6 | 0.46 |
| 14 | 10.6 | 0.55 | 0.64 | 0.036 | 0.057 | 0.002 | Remainder | 0.062 | 6.3 | 0.40 |
| 15 | 10.1 | 0.54 | 0.64 | 0.035 | 0.058 | 0.001 | Remainder | 0.059 | 6.2 | 0.39 |
| 16 | 9.3 | 0.53 | 0.58 | 0.035 | 0.059 | 0.051 | Remainder | 0.151 | 6.0 | 0.39 |

TABLE 2

[Examples of Present Invention]

| | Alloy Component Composition | | | | | | | Atomic Ratios of Alloy Elements | | |
|---|---|---|---|---|---|---|---|---|---|---|
| | Addition Elements (mass %) | | | | | | | Atomic Ratio | Atomic Ratio | Atomic Ratio |
| No. | Zn | Sn | Ni | Fe | P | Co | Cu | (Fe + Co)/Ni | (Ni + Fe + Co)/P | Sn/(Ni + Fe + Co) |
| 17 | 5.4 | 0.60 | 0.55 | 0.053 | 0.049 | — | Remainder | 0.101 | 6.5 | 0.49 |
| 18 | 5.1 | 0.30 | 0.45 | 0.017 | 0.050 | — | Remainder | 0.040 | 4.9 | 0.32 |
| 19 | 5.1 | 0.87 | 0.11 | 0.083 | 0.034 | — | Remainder | 0.793 | 3.1 | 2.18 |
| 20 | 4.8 | 0.56 | 0.31 | 0.054 | 0.055 | — | Remainder | 0.183 | 3.5 | 0.75 |

TABLE 2-continued

[Examples of Present Invention]

| | Alloy Component Composition | | | | | | | Atomic Ratios of Alloy Elements | | |
|---|---|---|---|---|---|---|---|---|---|---|
| | Addition Elements (mass %) | | | | | | | Atomic Ratio | Atomic Ratio | Atomic Ratio |
| No. | Zn | Sn | Ni | Fe | P | Co | Cu | (Fe + Co)/Ni | (Ni + Fe + Co)/P | Sn/(Ni + Fe + Co) |
| 21 | 5.7 | 0.60 | 0.78 | 0.016 | 0.046 | — | Remainder | 0.022 | 9.1 | 0.37 |
| 22 | 4.5 | 0.51 | 0.55 | 0.006 | 0.048 | — | Remainder | 0.011 | 6.1 | 0.45 |
| 23 | 5.7 | 0.64 | 0.63 | 0.084 | 0.059 | — | Remainder | 0.140 | 6.4 | 0.44 |
| 24 | 4.6 | 0.58 | 0.51 | 0.009 | 0.027 | — | Remainder | 0.019 | 10.2 | 0.55 |
| 25 | 4.9 | 0.66 | 0.61 | 0.022 | 0.068 | — | Remainder | 0.038 | 4.9 | 0.52 |
| 26 | 4.9 | 0.56 | 0.65 | 0.008 | 0.045 | 0.026 | Remainder | 0.053 | 8.0 | 0.40 |
| 27 | 2.8 | 0.59 | 0.47 | 0.029 | 0.055 | — | Remainder | 0.065 | 4.8 | 0.58 |

TABLE 3

[Examples of Present Invention]

| | Alloy Component Composition | | | | | | | Atomic Ratios of Alloy Elements | | |
|---|---|---|---|---|---|---|---|---|---|---|
| | Addition Elements (mass %) | | | | | | | Atomic Ratio | Atomic Ratio | Atomic Ratio |
| No. | Zn | Sn | Ni | Fe | P | Co | Cu | (Fe + Co)/Ni | (Ni + Fe + Co)/P | Sn/(Ni + Fe + Co) |
| 28 | 14.4 | 0.72 | 0.90 | 0.022 | 0.005 | — | Remainder | 0.026 | 97.4 | 0.39 |
| 29 | 14.5 | 0.66 | 0.84 | 0.013 | 0.010 | — | Remainder | 0.016 | 45.0 | 0.38 |
| 30 | 10.1 | 0.59 | 0.91 | 0.032 | 0.018 | — | Remainder | 0.037 | 27.7 | 0.31 |
| 31 | 2.7 | 0.64 | 0.94 | 0.022 | 0.006 | 0.012 | Remainder | 0.037 | 85.8 | 0.32 |
| 32 | 14.4 | 0.61 | 0.96 | 0.025 | 0.012 | 0.015 | Remainder | 0.043 | 44.0 | 0.30 |
| 33 | 10.1 | 0.56 | 0.69 | 0.012 | 0.020 | 0.024 | Remainder | 0.053 | 19.2 | 0.38 |
| 34 | 10.2 | 0.20 | 0.81 | 0.022 | 0.037 | — | Remainder | 0.029 | 11.9 | 0.12 |
| 35 | 9.3 | 0.27 | 0.60 | 0.016 | 0.035 | — | Remainder | 0.028 | 9.3 | 0.22 |
| 36 | 9.8 | 0.31 | 0.57 | 0.013 | 0.041 | — | Remainder | 0.024 | 7.5 | 0.26 |
| 37 | 4.5 | 0.19 | 0.78 | 0.021 | 0.037 | 0.034 | Remainder | 0.072 | 11.9 | 0.11 |
| 38 | 7.1 | 0.27 | 0.56 | 0.011 | 0.031 | 0.037 | Remainder | 0.086 | 10.4 | 0.22 |
| 39 | 5.6 | 0.34 | 0.59 | 0.022 | 0.024 | 0.034 | Remainder | 0.097 | 14.2 | 0.26 |

TABLE 4

[Comparative Example]

| | Alloy Component Composition | | | | | | | Atomic Ratios of Alloy Elements | | |
|---|---|---|---|---|---|---|---|---|---|---|
| | Addition Elements (mass %) | | | | | | | Atomic Ratio | Atomic Ratio | Atomic Ratio |
| No. | Zn | Sn | Ni | Fe | P | Co | Cu | (Fe + Co)/Ni | (Ni + Fe + Co)/P | Sn/(Ni + Fe + Co) |
| 51 | 28.9 | — | — | — | — | — | Remainder | — | — | — |
| 52 | 21.4 | 0.61 | 0.59 | 0.021 | 0.051 | — | Remainder | 0.037 | 6.3 | 0.49 |
| 53 | 14.1 | 1.10 | — | — | — | — | Remainder | — | — | — |
| 54 | 14.4 | — | 1.20 | — | — | — | Remainder | 0.000 | — | 0.00 |
| 55 | 14.8 | — | — | — | 0.004 | — | Remainder | — | — | — |
| 56 | 14.1 | 0.41 | — | 0.210 | 0.110 | — | Remainder | — | 1.1 | 0.92 |
| 57 | 14.7 | 0.01 | 0.04 | — | 0.001 | — | Remainder | 0.000 | 21.1 | 0.12 |
| 58 | 5.1 | — | — | — | — | — | Remainder | — | — | — |

TABLE 5

[Examples of Present Invention]

| | Steps | | | | Evaluation | | | | | | |
|---|---|---|---|---|---|---|---|---|---|---|---|
| No. | Homogeni-zation Temperature (° C.) | Hot Rolling Start Temperature (° C.) | Finish Rolling Reduction (%) | Finish Heat Treatment Temperature (° C.) | Grain Size (μm) | Conduc-tivity (% IACS) | Yield Strength (MPa) | Strength (MPa) | Yield Ratio | Bend-ability | Stress Relaxation Resistance |
| 1 | 800 | 800 | 59 | 400 | 1.5 | 25 | 551 | 600 | 91.8% | ○ | ○ |
| 2 | 800 | 800 | 55 | 350 | 1.5 | 25 | 558 | 601 | 92.8% | ○ | ○ |
| 3 | 800 | 800 | 47 | 300 | 1.5 | 25 | 575 | 608 | 94.5% | ○ | ○ |
| 4 | 800 | 800 | 46 | 350 | 1.6 | 29 | 546 | 572 | 95.4% | ○ | ○ |
| 5 | 800 | 800 | 27 | 400 | 2.7 | 30 | 461 | 477 | 96.7% | ○ | ○ |
| 6 | 800 | 800 | 43 | 400 | 2.2 | 31 | 486 | 506 | 96.1% | ○ | ○ |
| 7 | 800 | 800 | 42 | 350 | 2.0 | 27 | 556 | 575 | 96.7% | ○ | ○ |
| 8 | 800 | 800 | 44 | 350 | 2.5 | 29 | 501 | 518 | 96.7% | ○ | ○ |
| 9 | 800 | 800 | 55 | 400 | 1.8 | 26 | 563 | 589 | 95.6% | ○ | ○ |
| 10 | 800 | 800 | 49 | 350 | 2.2 | 31 | 518 | 538 | 96.3% | ○ | ○ |
| 11 | 800 | 800 | 45 | 350 | 2.1 | 31 | 516 | 539 | 95.7% | ○ | ○ |
| 12 | 800 | 800 | 47 | 350 | 2.2 | 29 | 513 | 537 | 95.5% | ○ | ○ |
| 13 | 800 | 800 | 56 | 350 | 1.8 | 26 | 578 | 607 | 95.2% | ○ | ○ |
| 14 | 800 | 800 | 50 | 350 | 2.0 | 28 | 513 | 532 | 96.4% | ○ | ○ |
| 15 | 800 | 800 | 45 | 350 | 2.0 | 28 | 511 | 528 | 96.7% | ○ | ○ |
| 16 | 800 | 800 | 42 | 350 | 1.9 | 28 | 561 | 579 | 97.0% | ○ | ○ |

TABLE 6

[Examples of Present Invention]

| | Steps | | | | Evaluation | | | | | | |
|---|---|---|---|---|---|---|---|---|---|---|---|
| No. | Homogeni-zation Temperature (° C.) | Hot Rolling Start Temperature (° C.) | Finish Rolling Reduction (%) | Finish Heat Treatment Temperature (° C.) | Grain Size (μm) | Conduc-tivity (% IACS) | Yield Strength (MPa) | Strength (MPa) | Yield Ratio | Bend-ability | Stress Relaxation Resistance |
| 17 | 800 | 800 | 66 | 300 | 1.6 | 32 | 473 | 491 | 96.2% | ○ | ○ |
| 18 | 800 | 800 | 45 | 300 | 2.5 | 36 | 461 | 475 | 97.0% | ○ | ○ |
| 19 | 800 | 800 | 58 | 300 | 1.9 | 30 | 478 | 494 | 96.8% | ○ | ○ |
| 20 | 800 | 800 | 54 | 350 | 2.0 | 34 | 435 | 453 | 96.1% | ○ | ○ |
| 21 | 800 | 800 | 53 | 350 | 2.3 | 31 | 474 | 492 | 96.4% | ○ | ○ |
| 22 | 800 | 800 | 43 | 350 | 2.6 | 36 | 429 | 445 | 96.5% | ○ | ○ |
| 23 | 800 | 800 | 46 | 350 | 2.2 | 29 | 470 | 493 | 95.4% | ○ | ○ |
| 24 | 800 | 800 | 51 | 300 | 2.9 | 35 | 422 | 440 | 95.9% | ○ | ○ |
| 25 | 800 | 800 | 56 | 350 | 1.9 | 30 | 477 | 496 | 96.1% | ○ | ○ |
| 26 | 800 | 800 | 47 | 300 | 2.3 | 32 | 462 | 480 | 96.1% | ○ | ○ |
| 27 | 800 | 800 | 56 | 350 | 2.3 | 35 | 452 | 474 | 95.4% | ○ | ○ |

TABLE 7

[Examples of Present Invention]

| | Steps | | | | Evaluation | | | | | | |
|---|---|---|---|---|---|---|---|---|---|---|---|
| No. | Homogeni-zation Temperature (° C.) | Hot Rolling Start Temperature (° C.) | Finish Rolling Reduction (%) | Finish Heat Treatment Temperature (° C.) | Grain Size (μm) | Conduc-tivity (% IACS) | Yield Strength (MPa) | Strength (MPa) | Yield Ratio | Bend-ability | Stress Relaxation Resistance |
| 28 | 800 | 800 | 45 | 350 | 5.1 | 25 | 519 | 552 | 94.1% | ○ | ○ |
| 29 | 800 | 800 | 48 | 350 | 4.4 | 24 | 520 | 548 | 94.9% | ○ | ○ |

TABLE 7-continued

[Examples of Present Invention]

| | Steps | | | | Evaluation | | | | | | |
|---|---|---|---|---|---|---|---|---|---|---|---|
| No. | Homogenization Temperature (° C.) | Hot Rolling Start Temperature (° C.) | Finish Rolling Reduction (%) | Finish Heat Treatment Temperature (° C.) | Grain Size (μm) | Conductivity (% IACS) | Yield Strength (MPa) | Strength (MPa) | Yield Ratio | Bendability | Stress Relaxation Resistance |
| 30 | 800 | 800 | 61 | 350 | 3.6 | 27 | 501 | 527 | 95.1% | ○ | ○ |
| 31 | 800 | 800 | 69 | 350 | 5.3 | 35 | 431 | 457 | 94.4% | ○ | ○ |
| 32 | 800 | 800 | 46 | 350 | 4.1 | 24 | 466 | 493 | 94.6% | ○ | ○ |
| 33 | 800 | 800 | 61 | 350 | 3.7 | 27 | 454 | 478 | 95.0% | ○ | ○ |
| 34 | 800 | 800 | 58 | 350 | 5.5 | 29 | 455 | 483 | 94.3% | ○ | ○ |
| 35 | 800 | 800 | 59 | 350 | 4.4 | 30 | 500 | 529 | 94.5% | ○ | ○ |
| 36 | 800 | 800 | 63 | 350 | 3.4 | 29 | 498 | 525 | 94.9% | ○ | ○ |
| 37 | 800 | 800 | 68 | 300 | 6.0 | 33 | 425 | 451 | 94.3% | ○ | ○ |
| 38 | 800 | 800 | 59 | 350 | 4.5 | 33 | 494 | 522 | 94.6% | ○ | ○ |
| 39 | 800 | 800 | 68 | 350 | 3.8 | 35 | 434 | 457 | 95.0% | ○ | ○ |

TABLE 8

[Comparative Example]

| | Steps | | | | Evaluation | | | | | | |
|---|---|---|---|---|---|---|---|---|---|---|---|
| No. | Homogenization Temperature (° C.) | Hot Rolling Start Temperature (° C.) | Finish Rolling Reduction (%) | Finish Heat Treatment Temperature (° C.) | Grain Size (μm) | Conductivity (% IACS) | Yield Strength (MPa) | Strength (MPa) | Yield Ratio | Bendability | Stress Relaxation Resistance |
| 51 | 800 | 800 | 85 | 150 | 0.7 | 28 | 719 | 808 | 89.0% | X | X |
| 52 | 800 | 800 | 88 | 150 | 0.6 | 24 | 752 | 840 | 89.5% | X | X |
| 53 | 800 | 800 | 22 | 300 | 5.6 | 26 | 481 | 521 | 92.4% | ○ | X |
| 54 | 800 | 800 | 28 | 250 | 4.8 | 27 | 488 | 530 | 92.0% | ○ | X |
| 55 | 800 | 800 | 42 | 400 | 76 | 33 | 341 | 377 | 90.5% | ○ | X |
| 56 | 800 | 800 | 53 | 250 | 1.0 | 23 | 559 | 602 | 92.9% | ○ | X |
| 57 | 800 | 800 | 36 | 350 | 3.2 | 36 | 416 | 454 | 91.6% | ○ | X |
| 58 | 800 | 800 | 25 | 400 | 69 | 59 | 266 | 295 | 90.4% | ○ | X |

In Comparative Example No. 51 as the Cu-30 Zn alloy, bendability was poor.

In Comparative Example No. 52 as the Cu-20 Zn-based alloy in which the yield ratio in the direction parallel to the rolling direction was 90% or less, bendability was poor.

In Comparative Example No. 53 as the Cu-15 Zn-based alloy to which Ni, Fe, and P were not added, the stress relaxation resistance was poorer than that of the Cu-15 Zn-based alloys of Examples of the present invention.

In Comparative Example No. 54 as the Cu-15 Zn-based alloy to which Sn, Fe, and P were not added, the stress relaxation resistance was poorer than that of the Cu-15 Zn-based alloys of Examples of the present invention.

In Comparative Example No. 55 as the Cu-15 Zn-based alloy to which Sn, Ni, and Fe were not added, the stress relaxation resistance was poorer than that of the Cu-15 Zn-based alloys of Examples of the present invention.

In Comparative Example No. 56 as the Cu-15 Zn-based alloy to which Ni was not added, the stress relaxation resistance was poorer than that of the Cu-15 Zn-based alloys of Examples of the present invention.

In Comparative Example No. 57 as the Cu-15 Zn-based alloy to which Fe was not added, the stress relaxation resistance was poorer than that of the Cu-15 Zn-based alloys of Examples of the present invention.

In Comparative Example No. 58 as the Cu-5 Zn-based alloy to which Sn, Ni, Fe, and P were not added, the stress relaxation resistance was poor. In addition, the yield strength was low at 266 MPa.

On the other hand, in Examples No. 1 to 39 of the present invention, each content of the respective alloy elements was in the range defined in the present invention, the ratios between the alloy elements were in the range defined in the present invention, and the yield ratio in the direction parallel to the rolling direction was more than 90%. As a result, it was verified that the stress relaxation resistance was superior, a balance between yield strength and bendability was good, and applicability to a connector or other terminal members is sufficient.

INDUSTRIAL APPLICABILITY

The copper alloy for electric and electronic device according to the present invention is superior in stress relaxation resistance and balance between yield strength and bendability, has superior bendability when bent such that a bending axis is perpendicular to a rolling direction, and is suitable for a conductive component for electric and electronic device. Accordingly, the copper alloy sheet for electric and electronic device can be used for a conductive component for electric and electronic device such as a connector of a semiconductor device, other terminals thereof, a movable contact of an electromagnetic relay, or a lead frame.

The invention claimed is:

1. A copper alloy for electric and electronic devices, the copper alloy comprising:
   7.1 mass % to 15.0 mass % of Zn;
   0.10 mass % to 0.90 mass % of Sn;
   0.05 mass % to less than 1.00 mass % of Ni;
   0.001 mass % to 0.053 mass % of Fe;
   0.005 mass % to 0.100 mass % of P; and
   a remainder including Cu and unavoidable impurities,
   wherein a ratio Fe/Ni of a Fe content to a Ni content satisfies 0.002≤Fe/Ni<1.500 by atomic ratio,
   a ratio (Ni+Fe)/P of a total content (Ni+Fe) of Ni and Fe to a P content satisfies 5.5≤(Ni+Fe)/P<100.0 by atomic ratio,
   a ratio Sn/(Ni+Fe) of a Sn content to the total content (Ni+Fe) of Ni and Fe satisfies 0.10<Sn/(Ni+Fe)<5.00 by atomic ratio,
   a yield ratio YS/TS is more than 90.0% which is calculated from a tensile strength TS and a 0.2% yield strength YS when a tensile test is performed in a direction parallel to a rolling direction, and
   the 0.2% yield strength YS is more than or equal to 494 MPa.

2. The copper alloy for electric and electronic devices according to claim 1,
   wherein an average grain size is 50 μm or less.

3. A copper alloy sheet for electric and devices comprising:
   a rolled material formed of the copper alloy for the electric and electronic devices according to claim 1,
   wherein a thickness is in a range of 0.05 mm to 1.0 mm.

4. The copper alloy sheet for electric and electronic devices according to claim 3,
   wherein a surface is plated with Sn.

5. A conductive component for electric and electronic devices comprising:
   the copper alloy sheet for the electric and electronic devices according to claim 3.

6. A terminal comprising:
   the copper alloy sheet for the electric and electronic devices according to claim 3.

7. A conductive component for electric and electronic devices comprising:
   the copper alloy for the electric and electronic devices according to claim 1.

8. A terminal comprising:
   the copper alloy for the electric and electronic devices according to claim 1.

9. The copper alloy for electric and electronic devices according to claim 1,
   wherein a ratio Fe/Ni of a Fe content to a Ni content satisfies 0.002≤Fe/Ni≤1.000 by atomic ratio.

10. The copper alloy for electric and electronic devices according to claim 1,
    wherein a ratio Fe/Ni of a Fe content to a Ni content satisfies 0.005≤Fe/Ni≤0.500 by atomic ratio.

11. The copper alloy for electric and electronic device according to claim 1,
    wherein a ratio (Ni+Fe)/P of a total content (Ni+Fe) of Ni and Fe to a P content satisfies 5.5≤(Ni+Fe)/P≤50.0 by atomic ratio.

12. The copper alloy for electric and electronic devices according to claim 1,
    wherein a ratio (Ni+Fe)/P of a total content (Ni+Fe) of Ni and Fe to a P content satisfies 5.5≤(Ni+Fe)/P≤12.0 by atomic ratio.

13. The copper alloy for electric and electronic devices according to claim 1,
    wherein a ratio Sn/(Ni+Fe) of a Sn content to the total content (Ni+Fe) of Ni and Fe satisfies 0.20≤Sn/(Ni+Fe)≤2.50 by atomic ratio.

14. The copper alloy for electric and electronic devices according to claim 1,
    wherein a ratio Sn/(Ni+Fe) of a Sn content to the total content (Ni+Fe) of Ni and Fe satisfies 0.10<Sn/(Ni+Fe)≤1.50 by atomic ratio.

15. The copper alloy for electric and electronic devices according to claim 1,
    wherein a yield ratio YS/TS is 92.0% or more which is calculated from a tensile strength TS and a 0.2% yield strength YS when a tensile test is performed in a direction parallel to a rolling direction.

16. The copper alloy for electric and electronic device according to claim 1, wherein a ratio Ni/P of a Ni content to a P content satisfies 5.3≤Ni/P≤95.0 atomic ratio.

17. A copper alloy for electric and electronic devices, the copper alloy comprising:
    7.1 mass % to 15.0 mass % of Zn;
    0.10 mass % to 0.90 mass % of Sn;
    0.05 mass % to less than 1.00 mass % of Ni;
    0.001 mass % to 0.053 mass % of Fe;
    0.001 mass % to less than 0.100 mass % of Co;
    0.005 mass % to 0.100 mass % of P; and
    a remainder including Cu and unavoidable impurities,
    wherein a ratio (Fe+Co)/Ni of a total content of Fe and Co to a Ni content satisfies 0.002≤(Fe+Co)/Ni<1.500 by atomic ratio,
    a ratio (Ni+Fe+Co)/P of a total content (Ni+Fe+Co) of Ni, Fe, and Co to a P content satisfies 6.0≤(Ni+Fe+Co)/P<100.0 by atomic ratio,
    a ratio Sn/(Ni+Fe+Co) of a Sn content to the total content (Ni+Fe+Co) of Ni, Fe, and Co satisfies 0.10<Sn/(Ni+Fe+Co)<5.00 by atomic ratio,
    a yield ratio YS/TS is more than 90.0% which is calculated from a tensile strength TS and a 0.2% yield strength YS when a tensile test is performed in a direction parallel to a rolling direction, and
    the 0.2% yield strength YS is more than or equal to 494 MPa.

18. The copper alloy for electric and electronic devices according to claim 17,
    wherein a ratio (Fe+Co)/Ni of a total content of Fe and Co to a Ni content satisfies 0.002≤(Fe+Co)/Ni≤1.000 by atomic ratio.

19. The copper alloy for electric and electronic devices according to claim 17,
    wherein a ratio (Fe+Co)/Ni of a total content of Fe and Co to a Ni content satisfies 0.005≤(Fe+Co)/Ni≤0.500 by atomic ratio.

20. The copper alloy for electric and electronic devices according to claim 17,
    wherein a ratio (Ni+Fe+Co)/P of a total content (Ni+Fe+Co) of Ni, Fe, and Co to a P content satisfies 6.0≤(Ni+Fe+Co)/P≤50.0 by atomic ratio.

21. The copper alloy for electric and electronic devices according to claim 17,
    wherein a ratio (Ni+Fe+Co)/P of a total content (Ni+Fe+Co) of Ni, Fe, and Co to a P content satisfies 6.0≤(Ni+Fe+Co)/P≤12.0 by atomic ratio.

22. The copper alloy for electric and electronic devices according to claim 17,
wherein a ratio Sn/(Ni+Fe+Co) of a Sn content to the total content (Ni+Fe+Co) of Ni, Fe, and Co satisfies 0.20≤Sn/(Ni+Fe+Co)<2.50 by atomic ratio.

23. The copper alloy for electric and electronic devices according to claim 17,
wherein a ratio Sn/(Ni+Fe+Co) of a Sn content to the total content (Ni+Fe+Co) of Ni, Fe, and Co satisfies 0.10<Sn/(Ni+Fe+Co)≤1.50 by atomic ratio.

24. The copper alloy for electric and electronic devices according to claim 17,
wherein a yield ratio YS/TS is 92.0% or more which is calculated from a tensile strength TS and a 0.2% yield strength YS when a tensile test is performed in a direction parallel to a rolling direction.

25. The copper alloy for electric and electronic device according to claim 17, wherein a ratio Ni/P of a Ni content to a P content satisfies 5.2≤Ni/P≤42.2 by atomic ratio.

* * * * *